United States Patent Office 3,315,521
Patented Apr. 25, 1967

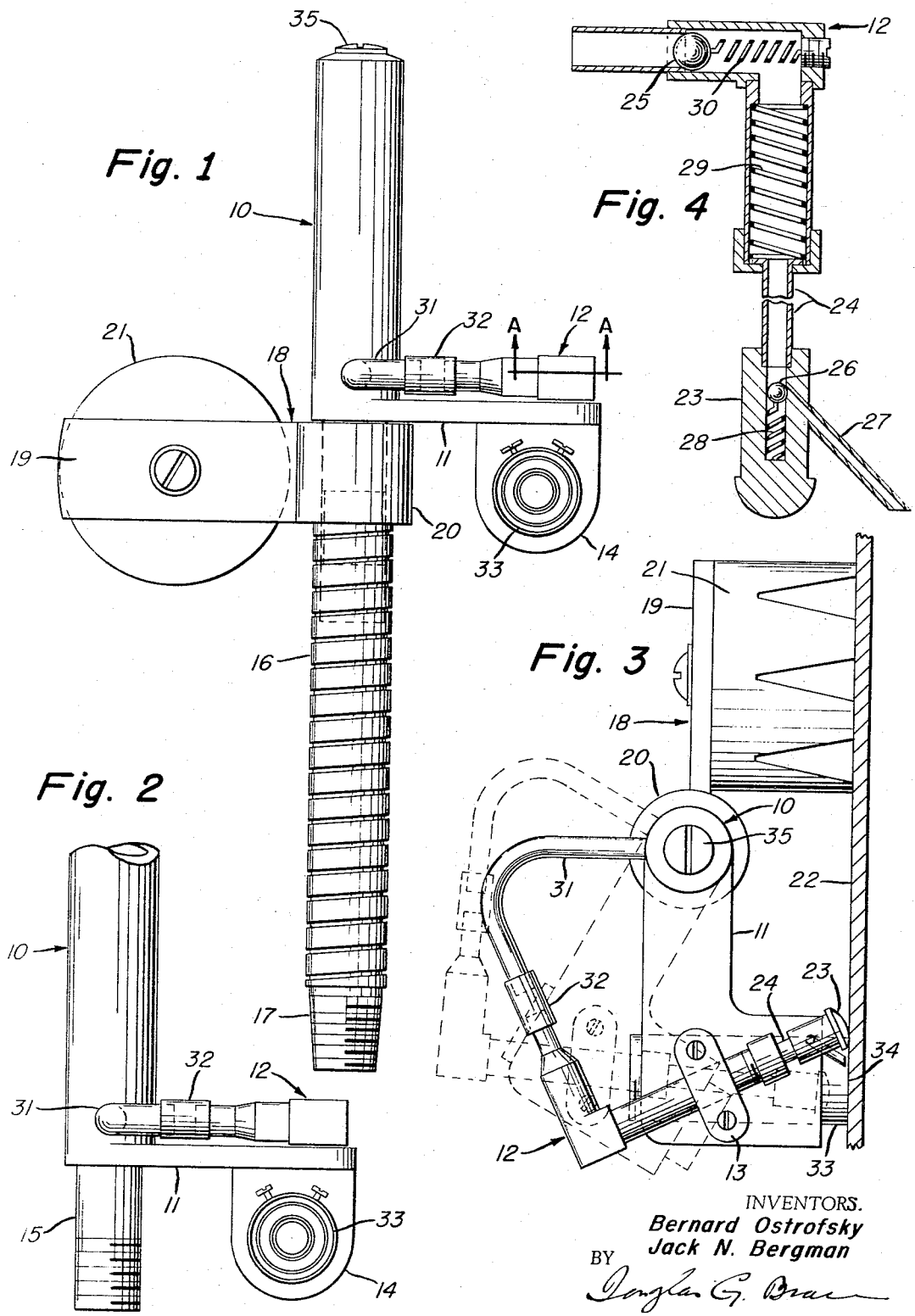

3,315,521
TRANSDUCER HOLDER
Bernard Ostrofsky, Gary, and Jack N. Bergman, Hammond, Ind., assignors to Standard Oil Company, Chicago, Ill., a corporation of Indiana
Filed Dec. 31, 1963, Ser. No. 334,773
5 Claims. (Cl. 73—71.5)

Our invention relates to a device which permits by ultrasonic methods the rapid and convenient measurement of the thickness of inaccessible objects and the detection of defects in such objects. It more particularly relates to a device which is used to hold a transducer unit that is being used for ultrasonic inspection.

Other uses of ultrasonic methods have been the testing of materials for defects and the measurement of the thicknesses of objects of which only one side was accessible to the tester, e.g., the thickness of the wall of a petroleum tank. Such ultrasonic testing consists of transmitting a pulse of vibrations into the object that is being inspected, the reflecting of part of these vibrations by an internal defect or by the opposite side of the object, and the measuring of the time intervals between the initial pulse and the arrival of the reflections.

In the testing of a material for defects or the measuring of the thickness of an object, a transducer is applied to the accessible surface of the object being inspected. A couplant is applied to the interface between the surface of the transducer and the surface of the object under inspection. The couplant may be any liquid with the proper acoustical character, e.g., motor oil or glycerine. The couplant is required to provide proper acoustic transfer from the transducer to the material being tested. An oscillator produces pulses which are transmitted by appropriate electrical circuitry through the transducer into the object being investigated. The reflections of the pulses are received by the transducer and appear on an oscilloscope which is also connected in the circuitry. Through the calibration of this electrical system, the inspector is able to determine the thickness of the object which is being inspected. The theories supporting ultrasonic methods, as well as a discussion of ultrasonic systems and their applications, are presented in Ultrasonics, Benson Carlin, McGraw-Hill Book Co., Inc. (1949).

A big disadvantage that presently occurs in the use of ultrasonic inspection techniques is the rapid excessive wear of the crystal faces of transducers. The transducer face in many instances is maintained in constant contact with the surface of the object under investigation, even when the transducer is slid across the surface of the object. Moreover, many parts of large objects are located such that any person employing ultrasonic examination must use ladders or auxiliary scaffolding. An example would be the examination of large petroleum tanks. He cannot remain at ground level or on a landing platform as he inspects the walls of the tank.

Our invention is a device which permits ultrasonic measurements to be made more rapidly and conveniently in the field. Its advantages are many. It is compact, easily handled, and of light-weight construction. It provides a method of using ultrasonic techniques without the accompanying rapid destruction to the transducer face. The design is such that the tester can move the transducer and test assembly from point to point on the object without causing excessive wear to the crystal face of the transducer. The transducer face is removed from the surface of the object under investigation prior to the moving of the test assembly from one point on the object's surface to another. Our invention permits the tester to inspect or measure the thicknesses of inaccessible objects. Furthermore, it permits without the use of ladders or auxiliary scaffolding the examination of objects which normally would require the use of such means in their examination. It provides the automatic ejection of couplant between the transducer face and the surface of the object under investigation. Adequate couplant is provided.

Our invention is an apparatus that is adapted to hold a transducer unit that is being employed for ultrasonically examining a solid material. This apparatus comprises, in combination, a reservoir adapted to contain a fluid couplant, a transducer holding means, a pumping means adapted for dispensing couplant, a first holding means, and an attaching means. The pumping means is adapted for dispensing couplant from the reservoir onto the surface of the material under inspection and between the surface and the face of the transducer. The first holding means is adapted to maintain the transducer holding means and the pumping means in fixed spatial relationship and is mounted on the reservoir. The attaching means is mounted on the reservoir and is adapted for temporarily fixing the assembled apparatus to the surface of the material under investigation and is adapted for ready separation from the surface. The attaching means is freely rotatable about the longitudinal axis of the reservoir and the first holding means is fixedly mounted on the reservoir. ble about the longitudinal axis of the reservoir and the first holding means is fixedly mounted on the reservoir. A specific embodiment of our invention comprises, in combination, a cylindrical reservoir for couplant which has at its lower end a stud, a pumping means for automatically dispensing couplant, a transducer holding means for holding a transducer unit, a first plate for supporting the pumping means and the transducer holding means, a magnet to hold the apparatus to the object under investigation, a second holding means to hold the magnet to the reservoir, and a detachable handle of variable length. The couplant reservoir and the stud have a common axis. The second holding means comprises a second plate and a bushing. The plane of this second plate is parallel to the axis of the couplant reservoir and the second plate is attached by one of its flat sides to the back of the magnet. The second plate is also connected to the outer surface of the bushing by one of the second plate's ends. This bushing is slipped over the stud. It has a common axis with the couplant reservoir and the stud and rotates about this common axis. The first plate is fixedly mounted to the base of the couplant reservoir just above the stud in such a manner that the plane of this particular plate is perpendicular to the axis of the couplant reservoir. The pumping means is clamped on the top face of this first plate and the transducer holding means is attached directly below the pumping means to the lower face of this first plate. The detachable handle, which is connected by any suitable means to the stud at the lower end of the reservoir, is made up of two segments, a flexible tube and a non-flexible rod.

The structure of this specific embodiment of our invention will be more fully understood with reference to the attached drawings.

FIGURE 1 presents an elevational view of the specific embodiment of our invention showing the attached flexible portion of the handle.

FIGURE 2 shows an elevational view of the couplant reservoir, stud and other directly connected parts.

FIGURE 3 shows a plan view of the specific embodiment of our invention with the magnet connected to the surface of an extrinsic object. The first plate and its associated parts are shown touching the object, as well as not touching the object. The dotted lines represent this part of the apparatus when it is not touching the extrinsic object.

FIGURE 4 presents an enlarged sectional view of section A—A of the pumping means used in the specific embodiment of our apparatus. This pumping means will hereinafter be called the couplant dispenser.

With reference to FIGURE 1, the couplant reservoir 10 is fixedly mounted to plate 11 at the base of reservoir 10. The plane of plate 11 is perpendicular to the axis of reservoir 10. The couplant dispenser 12 is securely fastened to the top of plate 11 by clamp 13. Directly below the couplant dispenser 12, but on the underside of plate 11, the transducer holding means, transducer holder 14 is connected by some suitable means. Hence, the couplant reservoir 10, couplant dispenser 12, transducer holder 14, and plate 11 are joined such that they move as a unit. As shown in FIGURE 2, the stud 15 extends from the bottom of couplant reservoir 10 and is concentric with reservoir 10. In FIGURE 1, the flexible portion of the detachable handle, flexible tube 16, is shown connected to stud 15. The straight, non-flexible portion, not shown, is connected to the free end 17 of flexible tube 16. This non-flexible rod is available in different lengths, a suitable length being selected to enable the person using this device to reach a particular spot on the object being inspected.

The second holding means 178 is comprised of plate 19 and bushing 20. Plate 19 is connected to the back of magnet 21, which holds our apparatus to the surface 23 of the object that is under study. Bushing 20 is slipped over stud 15 and is located just below the base of reservoir 10. Bushing 20 is free to rotate about the common axis of stud 15 and reservoir 10.

The design of this apparatus is such that any other part of the apparatus that is not directly or indirectly connected to the second holding means 18 can be rotated about the common axis of reservoir 10 and stud 15 without moving the second holding means 18, of which bushing 20 is a part. For example, if the handle, composed of the flexible tube 16 and the non-flexible rod (not shown), is rotated in a clockwise direction while magnet 21 is held against the surface of a stationary object, the assembly of reservoir 10, plate 11, couplant dispenser 12 and transducer holder 14 will be rotated about the common axis of reservoir 10 and stud 15 in a clockwise direction.

The couplant dispenser 12 is equipped with a movable head assembly, which comprises a head 23 and an associated neck 24.

When head 23 is pressed against an object, the head 23 and neck 24 are forced toward the body of dispenser 12. The couplant within dispenser 12 is compressed. Valve 25 is closed and valve 26 is forced open. Couplant is ejected from the dispenser 12 through nozzle 27. Nozzle 27 extends from dispenser head 23 downward and in such a direction as to have the line of its longitudinal axis pass through the vertical axis of transducer face 34 when the head 23 and neck 24 have been forced toward the body 12 of the dispenser. When the nozzle 27 is in such a position, couplant will be ejected from the nozzle 27 onto the surface of the object above the center of the transducer face so that it will flow down the surface of the object between the object and the transducer face. Valve 26 closes as spring 28 quickly overcomes the reduced pressure of the couplant. When the dispenser 12 and its movable head 23 are withdrawn from the object, spring 29 forces the neck 24 and head 23 to return to their original positions. Spring 30 opens valve 25 and couplant is permitted to flow by gravity sequentially from reservoir 10 through permanent line 31 and rubber tube 32 into the body of dispenser 12. When the head 23 is again forced against an object, the above functioning is repeated and couplant is ejected from nozzle 27.

The person using this apparatus to inspect the surface of some object, hereinafter referred to as the tester, takes the transducer-holder assembly, which contains the transducer 33, and places the magnet 21 against the particular surface of the object to be inspected. Magnet 21 holds the assembly against the ferrous surface 22 of the object. The shape of the magnet should be adapted to conform to the surface of the object. If the surface is not ferrous, other suitable means, such as a suction cup, may be used to hold the assembly to the object. The tester then rotates the non-flexible rod (not shown) in a clockwise direction. This causes the couplant dispenser 12 and its movable head 23, the transducer holder 14, the transducer 33, and the connecting plate 11 to move toward the object being inspected. The movable head 23 of the couplant dispenser 12 comes into contact with the surface 22 of the object. The plunger valve action of the dispenser as it is being pressed against the object causes couplant to be ejected from nozzle 27. The transducer face 34 then makes contact with the object and the measurement is made. After the measurement is completed, the non-flexible rod (not shown) is rotated in a counter-clockwise direction far enough to remove the transducer face 34 and dispenser head 23 from the surface 22 of the object. The entire assembly is then slid across the surface 22 of the object to the next point to be measured. Again the tester rotates the non-flexible rod in a clockwise direction so that the couplant dispenser head 23 makes contact with the surface 22 of the object, couplant is ejected from nozzle 27 and the transducer face 34 is permitted to contact the surface 22. The measurement is obtained and the procedure is repeated until all of the desired points of interest on the object have been investigated. The flexible section 16, which connects the rod (not shown) to the stud 15 of the assembly, permits the rod to be held at any necessary angle while the transducer face is maintained in a position against the object. Such a feature can be seen to permit flexibility and ease of handling.

The couplant reservoir 10 may be designed large enough to hold that quantity of couplant which is adequate for measurements needed for the inspection of the walls of a large tank before the couplant must be replenished. Couplant is added to the reservoir 10 by means of a hole at its top which is sealed by screw 35.

From the foregoing discussion, it can seen been that the face of the transducer does not come into contact with the surface of the object under investigation until a measurement is to be made. This minimizes wear to the transducer face. Through the use of different lengths of extension rods our invention may be used by the tester to examine the walls of tanks, pipes, and other pieces of equipment without the inspector being compelled to use additional ladders and scaffolding as he covers the entire surface of the object under investigation.

Thus, the present invention provides an apparatus for holding a transducer unit that is being used for ultrasonic inspection. This apparatus has such features as easy handling, the measurement or examination of numerous inaccessible points on a large surface without the requirement that the device be brought back to the tester for replenishment of the couplant, and minimum wear of the transducer face. In the case of the examination of the walls of a large tank, our invention should make the survey of this surface possible without the necessity of returning the device to the tester until the entire surface has been covered.

We claim:
1. An apparatus adapted to hold a transducer and used for ultrasonically examining a solid material, said apparatus comprising in combination:
(A) a reservoir adapted to contain a fluid couplant;
(B) first holding means;
(C) transducer holding means;
(D) pumping means adapted for dispensing couplant from said reservoir onto the surface of said material and between said surface and the face of said transducer upon contact of said pumping means with said surface, said first holding means being fixedly mounted on said reservoir and being adapted to maintain said transducer holding means and said pumping means in fixed spatial relationship; and (E) attaching means rotatably mounted on said reservoir and adapted for temporarily fixing the assembled apparatus to the surface of said material and adapted for ready separation from said surface, said attaching means being freely rotatable about the longitudinal axis of said reservoir, said apparatus being adapted to permit in sequence the engaging of said pumping means with said surface of said material, the dispensing of couplant by said pumping means between said face of said transducer and said surface, and the engaging of said face of said transducer with said surface when said reservoir is rotated about its longitudinal axis.

2. The apparatus of claim 1 wherein said reservoir is adapted at one extremity thereof to receive a flexible handle.

3. The apparatus of claim 1 wherein said pumping means comprises a first cylindrical tube having a concentric movable appendage at a first end thereof, said appendage moving reciprocally in said first cylindrical tube as force is applied and removed at the free end of said appendage, said appendage being spring-loaded, a second cylindrical tube located at the opposite end of said first cylindrical tube and having its longitudinal axis perpendicular to and intersecting the longitudinal axis of said first cylindrical tube, said cylindrical tubes having their interiors joined and adapted for the flow of fluid serially therethrough, the first end of said second cylindrical tube having an inlet for said apparatus and the opposite end being sealed, said nilet being sealed by a spring-loaded check valve, and a nozzle extending from said movable appendage at an angle and comprising an outlet for said apparatus, said outlet being sealed by a spring-loaded check valve and said angle being such as to direct fluid to a desired point.

4. The apparatus of claim 1 wherein said attaching means comprises a magnet and a second holding means, said magnet being fixedly connected to said second holding means and said second holding means being rotatably mounted on said reservoir.

5. The apparatus of claim 1 wherein said attaching means comprises a suction cup and a second holding means, said suction cup being fixedly connected to said second holding means and said second holding means being rotatably mounted on said reservoir.

References Cited by the Examiner

UNITED STATES PATENTS 2,645,938  7/1953  Billstein _____ 73—67.8 X

FOREIGN PATENTS 760,897  10/1953  Germany.
739,998  11/1955  Great Britain.

RICHARD C. QUEISSER, *Primary Examiner.*

J. P. BEAUCHAMP, *Assistant Examiner.*